United States Patent [19]

Nakayama et al.

[11] Patent Number: 4,703,186
[45] Date of Patent: Oct. 27, 1987

[54] HAND-HELD SCANNER WITH A SPEED CONTROL DEVICE

[75] Inventors: Nobuo Nakayama, Hirakata; Kenzi Nagamine, Kawachinagano; Kazuya Ueda, Nishinomiya; Fuminari Saito, Hirakata, all of Japan

[73] Assignee: Matsushita Electric Industrial Co., Ltd., Osaka, Japan

[21] Appl. No.: 753,966

[22] Filed: Jul. 11, 1985

[30] Foreign Application Priority Data

Jul. 12, 1984 [JP] Japan ................... 59-144629

[51] Int. Cl.$^4$ ............................................. G06K 7/10
[52] U.S. Cl. ..................... 250/566; 235/472; 188/83; 188/85; 188/159; 188/184; 382/59
[58] Field of Search .................. 250/566, 568; 188/83, 188/85, 159, 184, 290; 235/472; 382/59

[56] References Cited

U.S. PATENT DOCUMENTS

| | | | |
|---|---|---|---|
| 2,571,085 | 10/1951 | Clifford | 188/85 |
| 3,918,028 | 11/1975 | Humphrey et al. | 235/472 |
| 4,513,473 | 4/1985 | Omata | 188/290 |
| 4,553,035 | 11/1985 | Malinsky et al. | 250/566 |
| 4,556,155 | 12/1985 | Koppensteiner | 188/184 |
| 4,582,188 | 4/1986 | Seiz et al. | 188/83 |

Primary Examiner—Edward P. Westin
Assistant Examiner—Charles Wieland
Attorney, Agent, or Firm—Wenderoth, Lind & Ponack

[57] ABSTRACT

A hand-held scanner, namely, a hand-operated optical reader, capable of selectively and partially reading a necessary portion of a document. The hand-held scanner is equipped with a speed control device capable of producing a load for controlling the moving speed of the hand-operated scanning unit for approximate uniform motion to enable a compact and inexpensive apparatus to reproduce an original picture easily and accurately.

16 Claims, 9 Drawing Figures

HAND-HELD SCANNER WITH A SPEED CONTROL DEVICE

BACKGROUND OF THE INVENTION

1. Field of the Invention:

The present invention relates to a hand-held scanner (hand-operated scanning reader) and more particularly to a hand-held scanner capable of selectively and partially scanning a document to provide an image input signal.

2. Description of the Prior Art:

A conventional reader provides image signals on an assumption that subscanning is carried out accurately at equal intervals. In a hand-operated scanning reader, however, the running speed of the scanning unit is variable due to manual operation thereof. The variation of the scanning speed along the subscanning direction causes the image signals to be sent out at the wrong timing, and therefore the read image is distorted.

SUMMARY OF THE INVENTION

Accordingly, it is an object of the present invention to provide a hand-held scanner (hand-operated scanning reader) capable of eliminating the above-mentioned disadvantages of the conventional hand-held scanner and accurately deciding the timing of sending out an image signal.

In order to achieve the object of the invention, a hand-held scanner according to the present invention comprises a scanning unit consisting of a photoelectric conversion device and an optical system including a light source, capable of moving along the surface of a document, and connected to a speed control unit capable of controlling the scanning unit so that the scanning unit moves approximately at a constant speed.

It is necessary to produce a load for speed control in order to move the scanning unit approximately at a constant speed. The present invention may employ any load producing means which is capable of producing a load which acts so as to control the scanning unit to move approximately at a constant speed, such as a load producing means utilizing the viscosity of a fluid such as air or oil (for example, a wind wheel of a music box utilizing the resistance of air to the rotation of the wind wheel), a mechanical load producing means utilizing friction between solid bodies, or an electrical load producing means utilizing the functions of an electric field or a magnetic field (for example, means employing a DC motor which acts as a generator when rotated in the reverse direction and produces a load practically proportional to the revolving rate). Furthermore, the scanner of the present invention includes a device for detecting a position in the subscanning direction of the scanner, a device for specifying a read starting point and a read ending point, and a device for changing the resolution of the scanner to improve the functions of the hand-held scanner.

DESCRIPTION OF THE PREFERRED EMBODIMENTS

Preferred embodiments of the present invention will be described hereinafter in conjunction with the accompanying drawings.

First Embodiment

Figure 1:
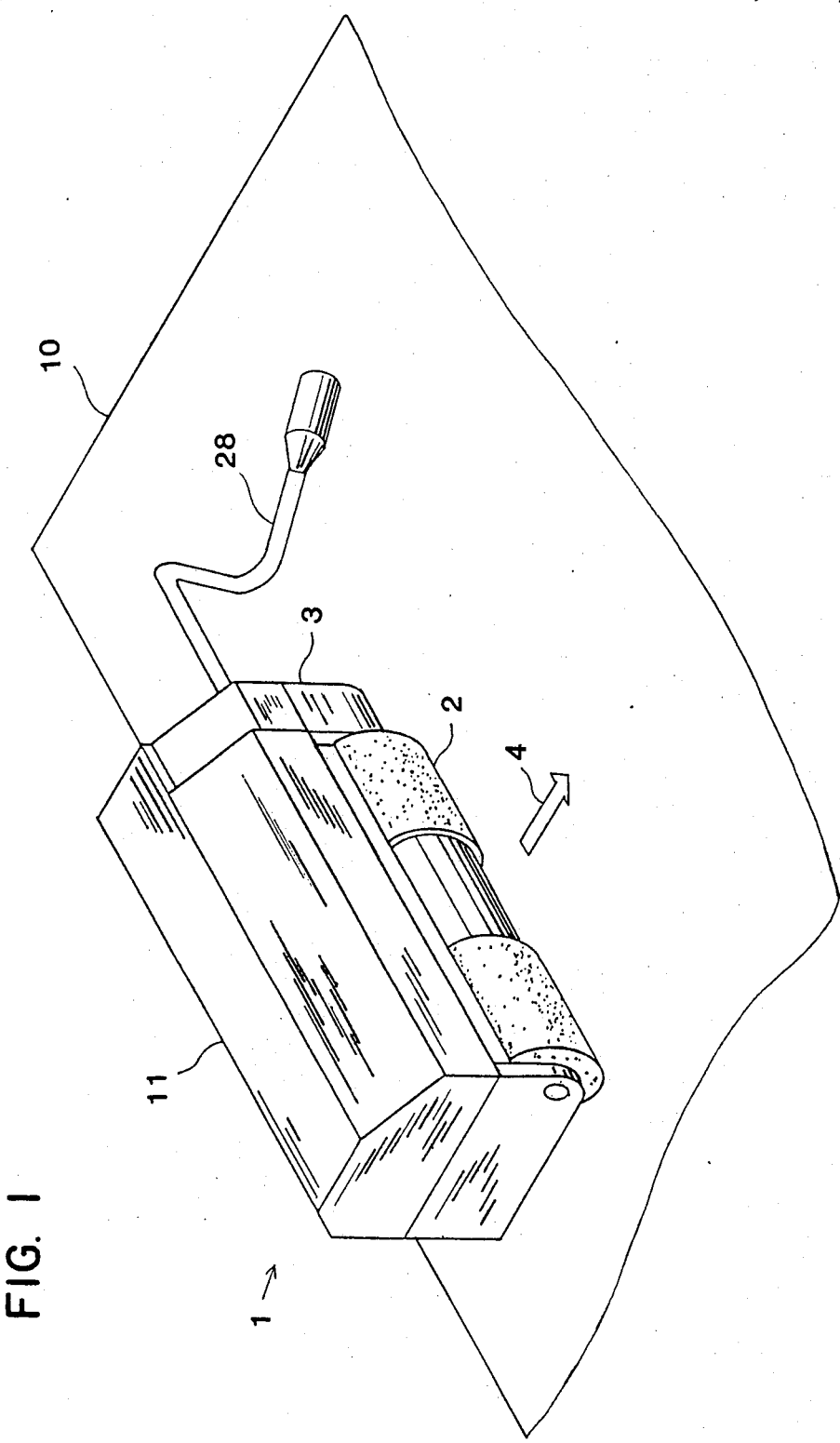
FIG. 1 is a perspective view of a hand-held scanner equipped with a speed control unit, in a first embodiment, according to the present invention.

FIG. 1 shows a schematic perspective view of a hand-held scanner according to a first embodiment of the present invention. A scanning unit 1 is encased by a casing 11 and has a guide roller 2 for moving on a copy 10 in the direction indicated by an arrow 4 (subscanning direction), a speed control means comprising a speed regulator 3 for regulating the moving speed of the hand scanner, and a cable 28 for electrically connecting the hand-held scanner to an external device (not shown) such as a computer.

Figure 2A:
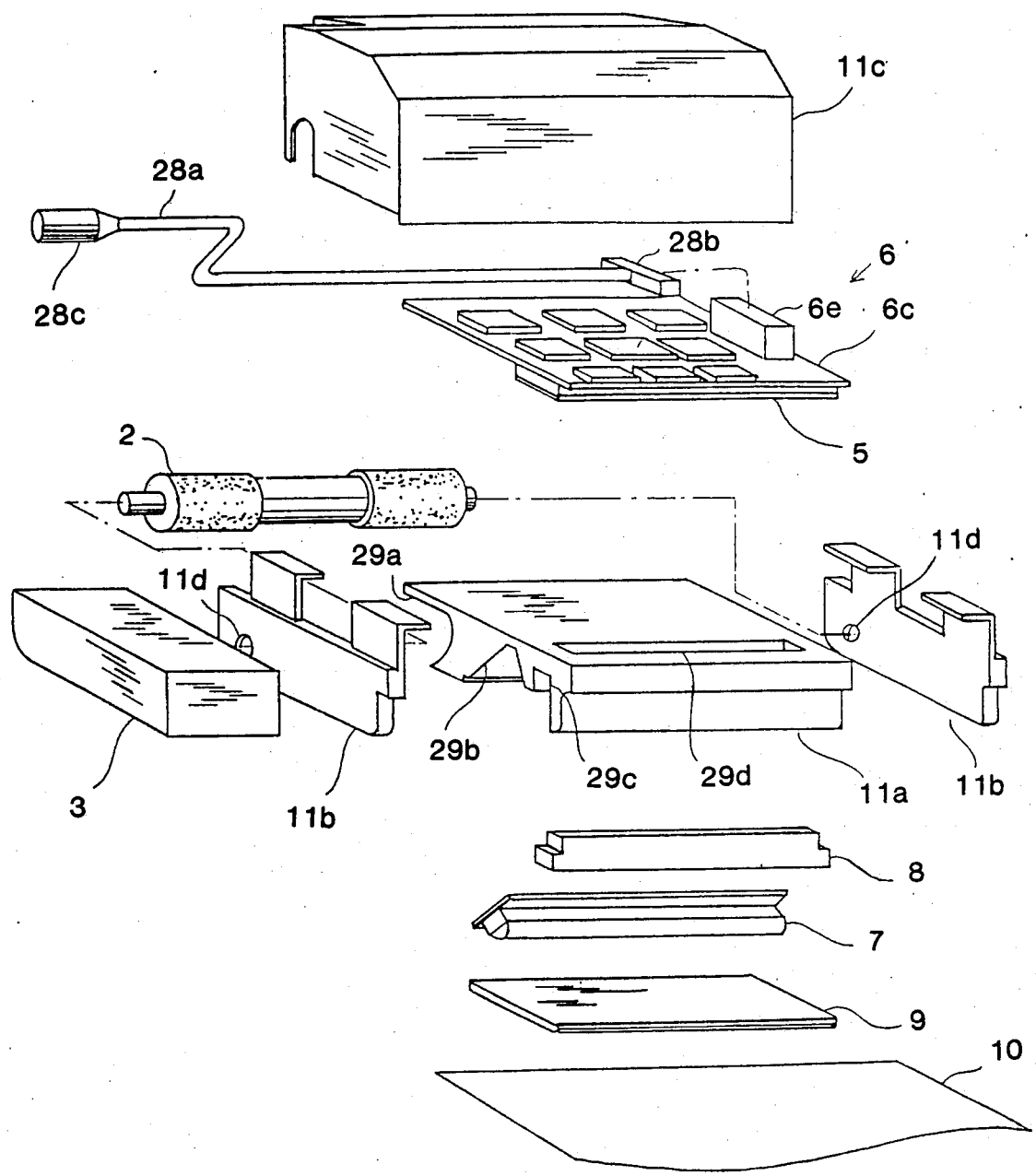
FIG. 2(A) is an exploded perspective view of the scanning unit and the speed control unit of FIG. 1.

FIG. 2(A) shows an exploded perspective view of the hand-held scanner shown in FIG. 1. The casing 11 is composed of an aluminum base frame 11a, side covers 11b and an upper cover 11c. A glass plate 9 is mounted on the bottom portion of the base frame 11a so as to face the surface of a copy 10. A light source, such as a light emitting diode array (LED array) 7 for irradiating the surface of the document to copied 10 is mounted in a groove 29b in the bottom surface of the base frame 11a. An optical lens system 8 such as a SELFOC lens array is fixed to a groove 29c in the bottom surface of the base frame 11a so as to transfer the reflected light from the surface of the document 10 to the upper side of the base frame 11a through an opening 29d extending from the groove 29c the the upper surface of the base frame 11a.

Above the base frame 11a is located means for converting reflected light from the document into electrical signals comprising an electrical circuit board 6 which includes a substrate 6c having mounted thereon electrical circuitry including a drive circuit 6a and a read signal processing circuit 6b, and a connector 6e. A cable 28a is connected at one end thereof with a connector 28b which is connected with the connector 6e, and at the other end thereof with a connector 28c which is connected with an external device (not shown).

At the bottom surface of the substrate 6c there is provided a photoelectric conversion device 5 such as a charge coupled device (CCD) image sensor for receiving the light transferred by the lens system 8 to obtain image information corresponding to the image on the document 10.

A guide roller 2 is loosely fitted into a groove 29a at the bottom surface of the base frame 11a. Opposite ends of the shaft of the guide roller 2 are respectively fitted into holes 11d provided on the side covers 11b, with one end of the shaft being connected to the speed regulator 3. This connection will be described later with reference to FIG. 3.

Figure 2B:
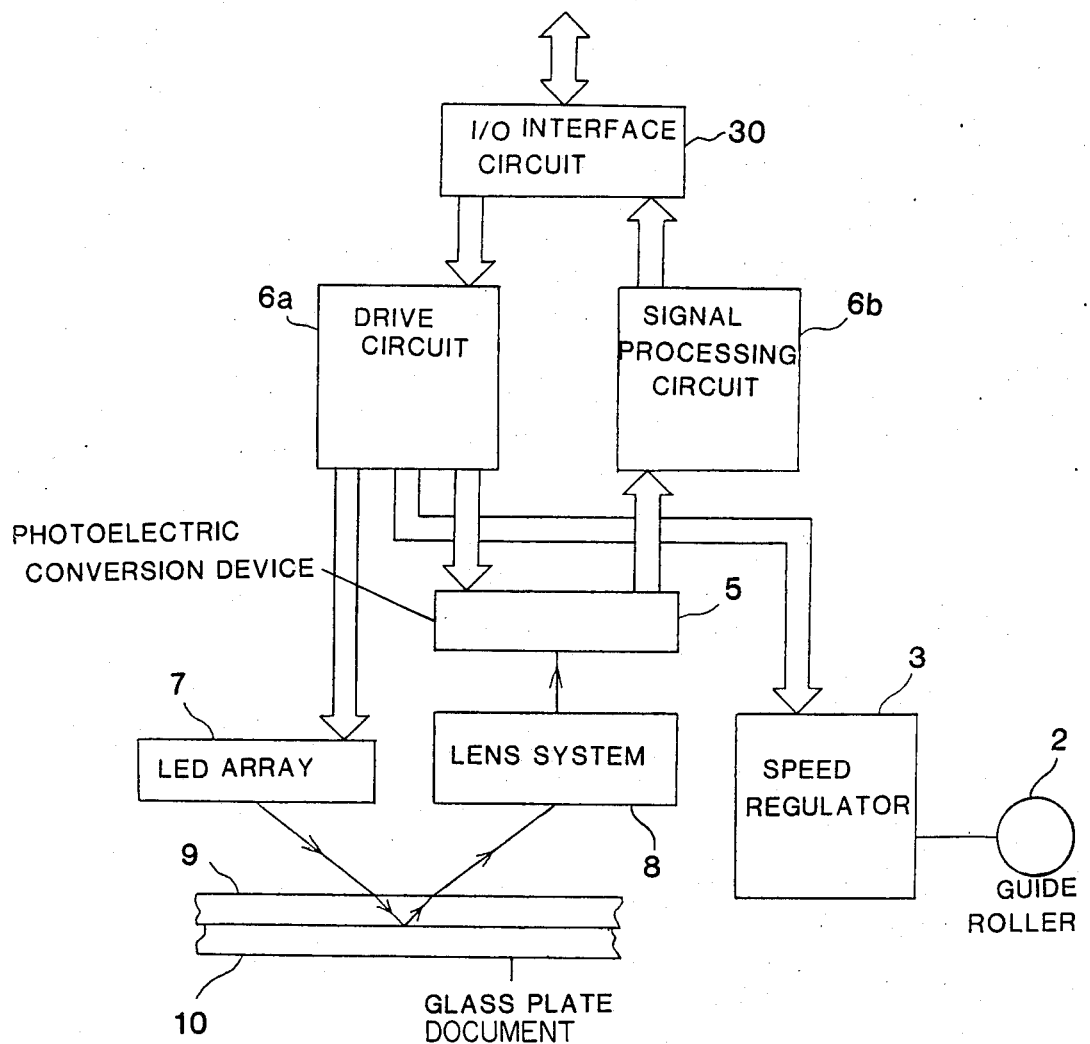
FIG. 2(B) is a block diagram showing the constitution of the hand-held scanner of FIG. 1.

FIG. 2 (B) shows a schematic block diagram of the hand-held scanner configured as shown in FIG. 2 (A). A drive circuit 6a is responsive to drive information sent from an external device through an input/output (I/O) interface circuit 30 and drives the LED array 7, the photoelectric conversion device 5 and the speed regulator 3. The light irradiated by the LED array 7 passes through the glass plate 9, is reflected by the surface of the document 10, passes again through the glass plate 9, is transferred by the lens system 8, and received by the photoelectric conversion device 5. The photoelectric conversion device 5 detects the image information contained in the reflected light and sends the detected image information to a signal processing circuit 6b. The signal processing circuit 6b processes the image information and sends the processed image information to the external device through the I/O interface circuit 30. The speed regulator 3 is connected with the guide roller 2 so as to regulate the moving speed of the hand-held scanner.

Figure 3:
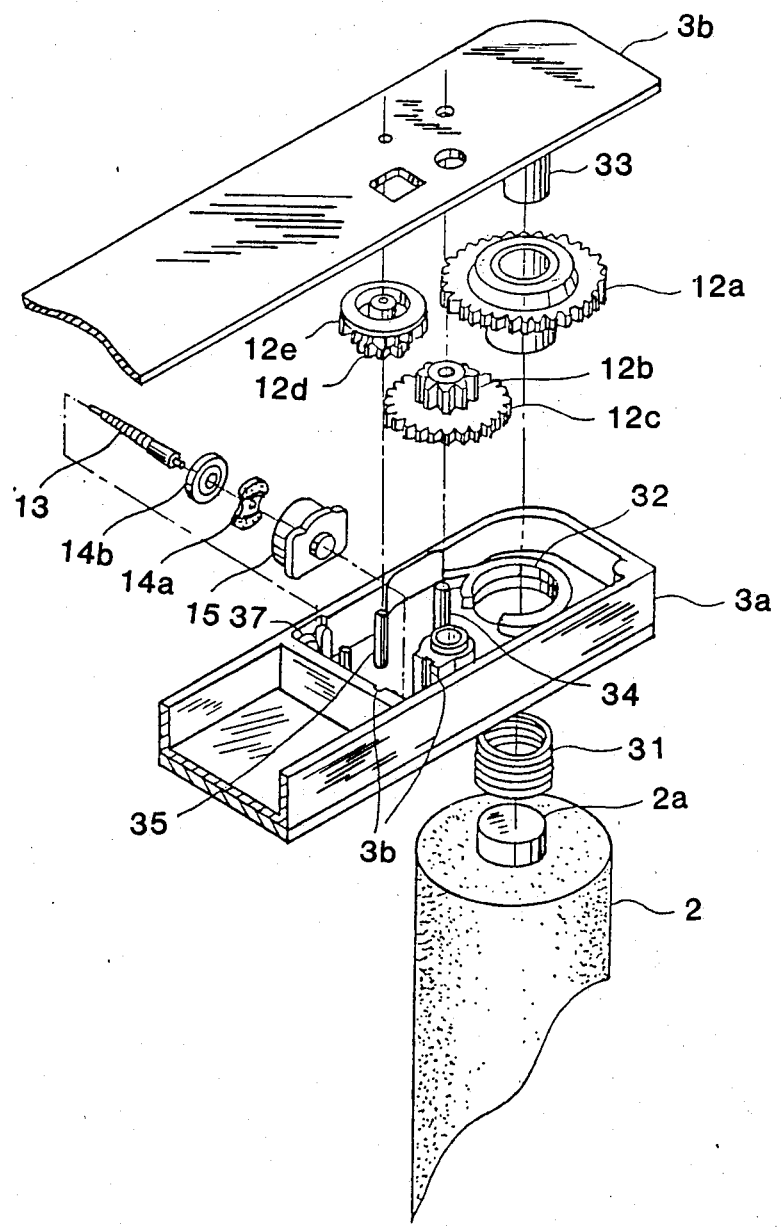
FIG. 3 is a fragmentary perspective view of the speed regulator of the hand-held scanner of FIG. 1.

FIG. 3 shows an exploded perspective view of an embodiment of the speed regulator 3, in which a speed regulating mechanism is provided in a casing composed of a base frame 3a and an upper cover 3b. A shaft 2a of the guide roller 2 is inserted into a coil spring 31 and connected to the shaft of a gear 12a which is located in the base frame 3a. The end of the shaft of the gear 12a facing the shaft 2a is fitted into an opening 32 of the base frame 3a, and the other end of the shaft of the gear 12a is rotatably mounted on a pole 33 fixed to the upper cover 3b. The gear 12a is engaged with a gear 12b which is coaxial with a gear 12c rotatably mounted on a pin 34 fixed to the base frame 3a. The gear 12c is engaged with a gear 12d which is coaxial with a gear 12e mounted on a pin 35 fixed to the base frame 3a. The gear 12e is engaged with a worm gear 13 which is supported at one end by a bearing 37 in the base frame 3a and at the other end by a frictional housing 15 which is fixed to a slot 36 in the base frame 3a. In the frictional housing 15, a friction disc 14a such as a rubber disc fixed to a fixing plate 14b is mounted on the worm gear 13 so as to be rotatable with the worm gear 13.

The inner surface of the frictional housing 15 contacts the friction disc 14a so that the rotation of the worm gear 13 is resisted by the friction force produced by the contact of the friction disc 14a with the inner surface of the frictional housing 15. Since the worm gear 13 is connected via the gears 12a-e to the guide roller 2, the rotation of the guide roller 2 is regulated by the above-said friction force.

The friction disc 14a may be constructed to expand radially according to the rotational speed thereof due to rotation of the worm gear 13 so as to become in contact with the inner surface of the frictional housing 15 when the rotational speed of the friction disc 14a exceeds a predetermined speed, which produces a load or opposing force proportional to the square of the angular velocity ($\omega$) of the frictional disc 14a rotatably connected to the guide roller 2. This allows the hand-held scanner to move approximately at a constant speed when moved by hand.

The range of variation of the thus regulated moving speed of the scanning unit 1 is as small as ±3% of the average speed or less, and hence the distortion of the read image relative to the original image is as small as ±3% or less, which in practice is not a problem.

Figure 4:
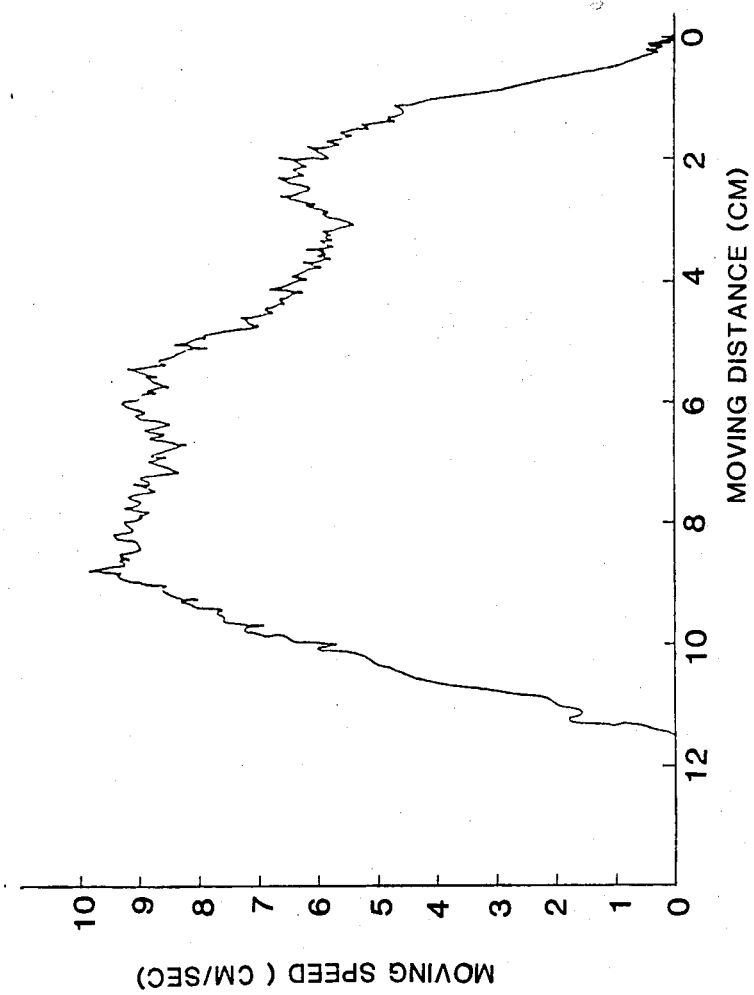
FIG. 4 is a graph showing the variation of the moving speed of the scanning unit of the hand-held scanner of FIG. 1, when the scanning unit is moved without the speed regulator.
Figure 5:
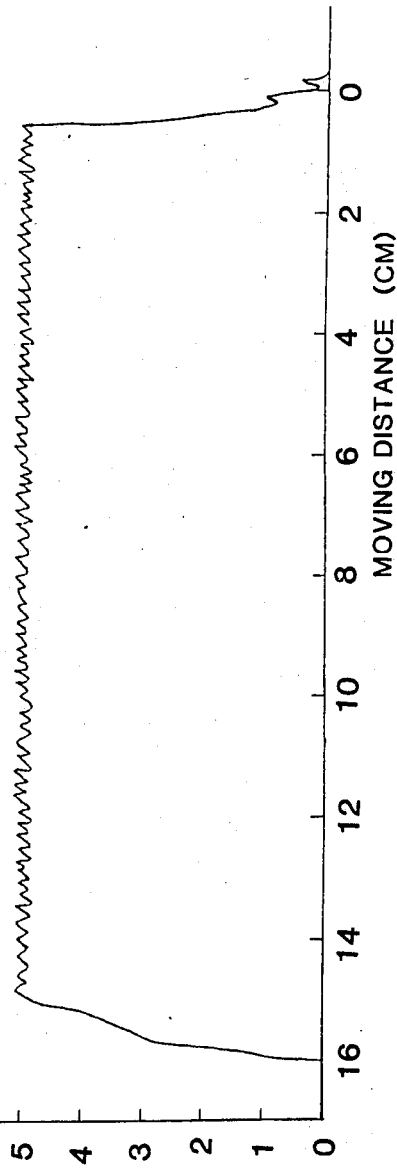
FIG. 5 is a graph showing the variation of the moving speed of the scanning unit of the hand-held scanner of FIG. 1, when the scanning unit is moved with the speed regulator.

FIG. 4 is a graph showing the variation of the moving speed of the scanning unit 1 of the hand-held scanner of FIG. 1, when the scanning unit 1 is moved without the speed regulator. As apparent from FIG. 4, the moving speed of the scanning unit varies over a wide range when the scanning unit 1 is moved without the speed regulator. On the contrary, as shown in FIG. 5, the speed regulator reduces the range of variation of the moving speed effectively to an extremely small range.

Second Embodiment

Figure 6:
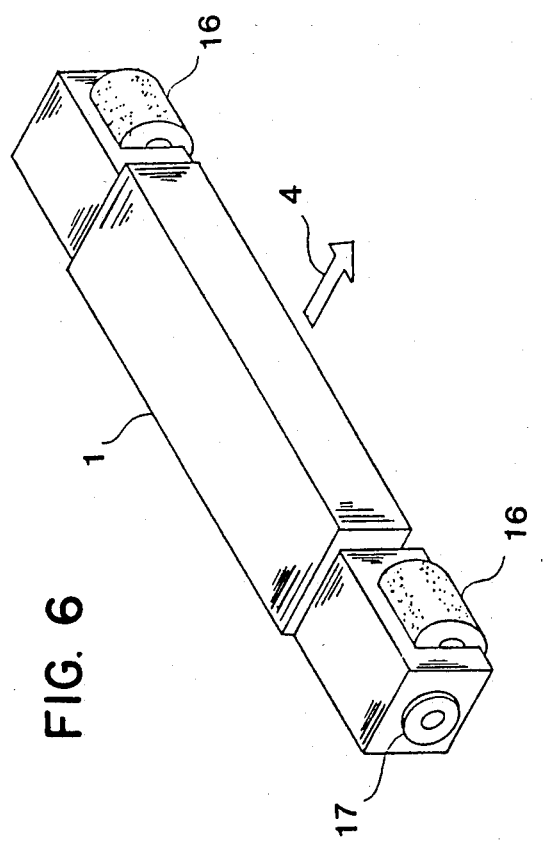
FIG. 6 is a perspective view of a hand-held scanner equipped with a flywheel speed regulator, in a second embodiment, according to the present invention.
Figure 7:
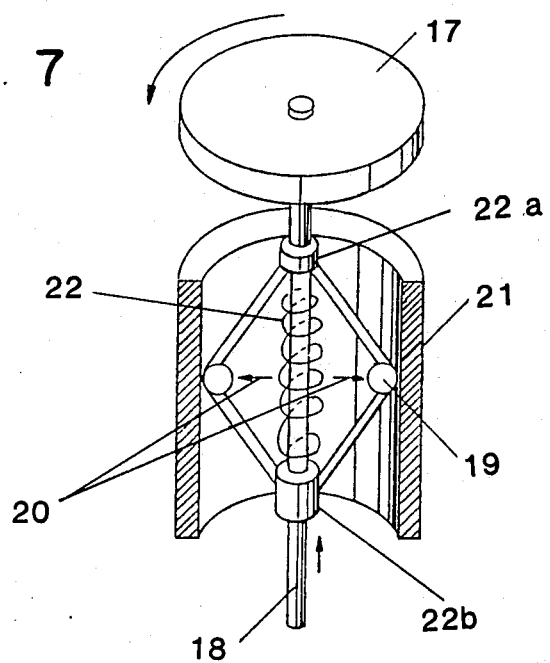
FIG. 7 is a perspective view showing the constitution of the flywheel speed regulator of FIG. 6.

A hand-held scanner equipped with a flywheel speed regulator according to a second embodiment the present invention is shown in FIG. 6. FIG. 7 is a cut-away detail view of the flywheel speed regulator.

A guide roller 16 on each side of the scanning unit 1 rotates as a scanning unit 1 is moved in the subscanning direction indicated by an arrow 4. The rotation of the guide roller 16 is transmitted by suitable means to a flywheel 17. The minute variation of the moving speed of the hand-operted scanning unit 1 is absorbed by the inertia of the flywheel 17. A rotary shaft 18 is connected to the flywheel 17 and extends within a pipe 21 which is fixed with respect to the rotary shaft 18. At least one weight 19 is mounted within the pipe 21 for rotation with the rotary shaft 18 such that the weight moves radially outwardly when the rotary shaft 18 is rotated. For example, a pair of collars 22a, 22b are mounted on the rotary shaft 18 such that at least one of the collars is free to move axially along the rotary shaft 18, as shown by the arrow in FIG. 7. A spring 22 carried by the rotary shaft is disposed between the collars 22a, 22b to urge them apart and supports extend between each of the collars and two weights 19 such that the weights move radially outwardly due to centrifugal force. As the rotary shaft 18 rotates, the weights 19 are pressed against the inner surface of the pipe 21 by centrifugal force 20 so that a frictional resistance act on the weights 19. The magnitude of the frictional resistance can optionally be preset by selecting the spring constant of the spring 22, the weight of the weights 19, the revolving rate of the rotary shaft 18 and the coefficient of friction between the weights 19 and the inner surface of the pipe 21. Basically, the frictional resistance is proportional to the revolving rate or speed of rotation of the rotary shaft 18 and preferably the frictional resistance between the weights 19 and the pipe 21 is proportional to the square of the angular velocity of the rotary shaft 18. This frictional resistance tends to maintain the revolving rate of the guide roller 16 at a constant level. Consequently, the moving speed of the scanning unit 1 in the subscanning direction indicated by the arrow 4 is controlled for an approximate uniform motion. The minute variations of the moving speed of the scanning unit 1 attributable to the manual operation of the scanning unit 1 are absorbed by the inertia of the flywheel 17, and hence the scanning unit 1 moves smoothly. The resultant variation of the moving speed of the hand-operated scanning unit in the subscanning direction is as small as ±2% of the average speed of less, and hence the distortion of the read image relative to the original image is reduced satisfactorily to 2% or less.

Third Embodiment

Figure 8:
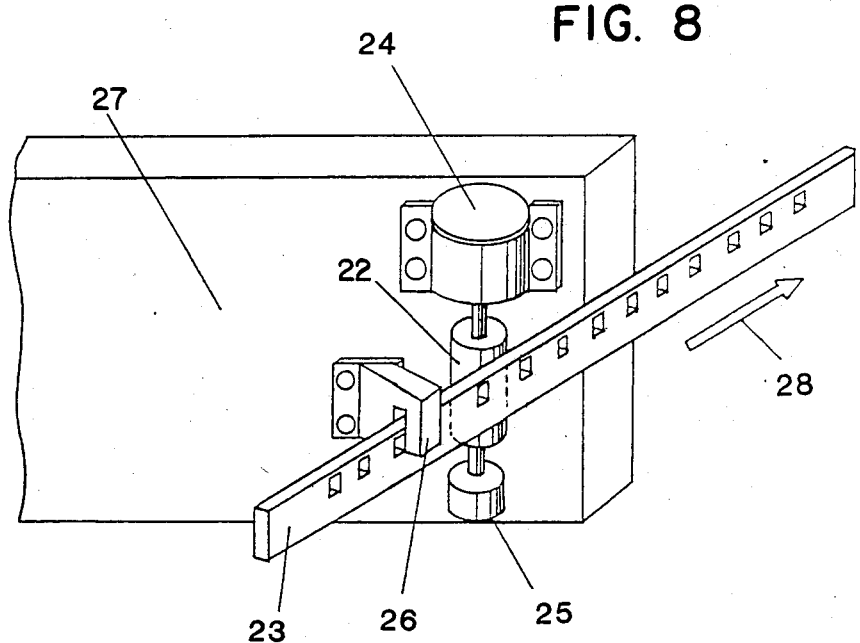
FIG. 8 is a fragmentary perspective view of a hand-held scanner, in a third embodiment, according to the present invention.

FIG. 8 shows a third embodiment of the present invention. As a scanning unit 27 (FIGS. 1, 2 and 6) is moved along a guide rail 23 in the subscanning direction indicated by an arrow 28, a guide roller 22 rotates, and thereby a DC motor 24 is rotated in the reverse direction. Then, the DC motor functions as a generator which produces a load practically proportional to the revolving rate thereof. The load thus produced tends to maintain the revolving rate of the guide roller at a fixed value, which controls the moving speed of the scanning unit for an approximate uniform motion.

The guide roller 22 also rotates the rotary shaft of a rotary encoder 25. The rotary encoder 25 is adapted to provide pulse signals so that the ratio of the number of pulse signals to the scanning pitch of the scanning unit 27 in the subscanning direction indicated by the arrow 28 is an integral ratio. In this embodiment, the rotary encoder provides ten pulse signals for every 1/16 mm of movement of the scanning unit for scanning operation at a resolving power of 16 lines/mm. Accordingly, it is possible to recognize the position of the scanning unit 27 along the subscanning direction at a high accuracy of one-tenth of the subscanning pitch. Thus the composite function of the rotary encoder and the speed regulator 24 (a device which produces a load by rotating the DC motor in the reverse direction) reduced the distortion of the read image relative to the original image on the document to 1% or less. Even if the speed regulator 24 does not function satisfactorily due to the movement of the scanning unit 27 at a low moving speed, the distortion of the image attributable to the variation of the moving speed of the scanning unit can be corrected.

The change of the resolving power of the CCD image sensor 5 can be achieved by setting the frequency dividing ratio between the reset pulse and the clock pulse of the driving circuit 6a at a predetermined ratio. For example, if the ratio between the clock pulse and the reset pulse is set at 2:1, the resolving power of the CCD image sensor 5 is changed from 16 lines/mm to 8 lines/mm.

In FIG. 8, indicated at 26 is a photocoupler attached to the scanning unit 27 for indicating a read starting point and a read terminal point. Furthermore, varying the luminous intensity of the light source 7 (FIG. 2) mounted on the scanning unit 27 according to the variation of the pulse signals of the rotary encoder 25 enables accurate reading of the original image.

What is claimed is:

1. A hand-held scanner moved on a document by a motive force given by an operator for inputting an image on the document, comprising:
   a scanning unit comprising a light source for emitting light to irradiate the document, and means for converting reflected light from the document to electric signals;
   a guide roller mounted on the scanning unit and rolling on the document by the motive force given by the operator to move the scanning unit; and
   speed control means coupled to the guide roller for producing a resistance force in a direction opposite to the direction of rotation of the guide roller when the guide roller is rolled on the document and the speed of rotation of the guide roller exceeds a predetermined rotating speed thereby controlling the scanner to move at a constant speed.

2. The hand-held scanner according to claim 1, wherein the speed control means comprises a friction disc rotated by the rotating force of the guide roller, and a frictional housing encasing therein the friction disc, the friction disc being expanded radially by a centrifugal force to be brought into contact with an inner surface of the frictional housing when the rotating speed of the guide roller exceeds the predetermined rotating speed thereby causing a frictional resistance acting as the resistance force.

3. The hand-held scanner according to claim 1, wherein the speed control means comprises a weight revolved by the rotating force of the guide roller, and a frictional pipe encasing therein the weight, the weight being moved radially by a centrifugal force to be brought into contact with an inner surface of the frictional pipe when the rotating speed of the guide roller exceeds the predetermined rotating speed thereby causing a frictional resistance acting as the resistance force.

4. The hand-held scanner according to claim 1, further comprising a flywheel connected to the guide roller for rotation therewith thereby absorbing a minute variation of the moving speed of the scanner.

5. A hand-held scanner used by manual movement thereof over the surface of a document to be copied, comprising:
   a scanning unit comprising a light source for transmitting light onto the surface of the document to be copied, means for converting light reflected from the document into electrical signals and a casing in which said light source and said converting means are housed;
   at least one guide roller rotatably mounted on said casing, said at least one guide roller having a cylindrical outer surface which rolls in contact with the surface of the document to be copied when said scanning unit is moved manually across the document to be copied; and
   speed control means disposed on said casing and connected to said at least one guide roller for producing a force resisting rotation of said at least one guide roller when the speed of rotation of said at least one guide roller exceeds a predetermined value.

6. The hand-held scanner according to claim 5, wherein said speed control means produces a force resisting rotation of said at least one guide roller which is proportional to the speed of rotation of said at least one guide roller.

7. The hand-held scanner according to claim 5, wherein said speed control means comprises a frictional housing, a friction disc rotatable mounded in said frictional housing, said friction disc being expandable radially due to rotation thereof, and means connecting said friction disc to said at least one guide roller for rotation therewith.

8. The hand-held scanner according to claim 7, wherein said means connecting said friction disc to said at least one guide roller comprises a plurality of gears.

9. The hand-held scanner according to claim 8, wherein said plurality of gears includes a worm gear connected to said friction disc for rotation therewith.

10. The hand-held scanner according to claim 5, wherein said speed control means comprises a pipe, a rotary shaft mounted for rotation in said pipe and connected to said at least one guide roller for rotation therewith, at least on weight connected to said rotary shaft for rotation therewith within said pipe, said at least one weight being movable radially outwardly away from said rotary shaft and into contact with an inner surface of said pipe when said rotary shaft is rotated.

11. The hand-held scanner according to claim 10, wherein frictional resistance between said at least one weight and said inner surface of said pipe is proportional to the speed of rotation of said rotary shaft.

12. The hand-held scanner according to claim 10, further comprising a flywheel connected to said at least one guide roller for rotation therewith.

13. The hand-held scanner according to claim 10, wherein said at least one guide roller comprises two guide rollers.

14. The hand-held scanner according to claim 10, wherein said at least one weight comprises two weights, each of said weights being carried by supports extending between a pair of spaced-apart collars, one of said collars being movable axially along said rotary shaft, and a spring being disposed between said collars for adjusting frictional force between said weights and said inner surface of said pipe.

15. The hand-held scanner according to claim 5, wherein said speed control means comprises a DC motor connected to said at least one guide roller such that said motor is rotated in a reverse direction when said at least one guide roller is rotated whereby said motor generates an electromotive force proportional to the speed of rotation of said at least one guide roller, said electromotive force resisting rotation of said at least one guide roller to thereby cause substantially uniform motion of said scanning unit when said scanning unit is moved manually.

16. The hand-held scanner according to claim 5, further comprising a rotary encoder for providing pulse signals to a signal processing circuit of said scanning unit when said scanning unit is moved manually whereby the position of said scanning unit along a sub-scanning direction can be determined with high accuracy.

* * * * *